(12) United States Patent  
Clark et al.

(10) Patent No.: US 8,022,983 B2  
(45) Date of Patent: Sep. 20, 2011

(54) BOREHOLE IMAGING SYSTEM FOR CONDUCTIVE AND RESISTIVE DRILLING FLUIDS

(75) Inventors: Brian Clark, Sugar Land, TX (US);  
Reza Taherian, Sugar Land, TX (US);  
Ruben Martinez, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1328 days.

(21) Appl. No.: 11/379,308

(22) Filed: Apr. 19, 2006

(65) Prior Publication Data

US 2006/0284975 A1 Dec. 21, 2006

Related U.S. Application Data

(60) Provisional application No. 60/676,372, filed on Apr. 29, 2005.

(51) Int. Cl.  
*H04N 7/18* (2006.01)

(52) U.S. Cl. .......................................................... 348/85

(58) Field of Classification Search .............. 348/82–85; 324/367; 175/40, 50  
See application file for complete search history.

(56) References Cited

U.S. PATENT DOCUMENTS

| 4,246,782 | A | * | 1/1981 | Hallmark ................... 73/152.25 |
| 4,422,043 | A |   | 12/1983 | Meador |
| 4,614,250 | A |   | 9/1986 | Panetta et al. |
| 4,689,572 | A |   | 8/1987 | Clark |
| 4,698,501 | A | * | 10/1987 | Paske ........................... 250/265 |
| 4,704,581 | A |   | 11/1987 | Clark |
| 4,845,433 | A |   | 7/1989 | Kleinberg et al. |
| 4,862,090 | A | * | 8/1989 | Vannier et al. ................ 324/367 |
| 5,095,272 | A |   | 3/1992 | Sinclair |
| 5,107,705 | A | * | 4/1992 | Wraight et al. ............ 73/152.03 |
| 5,287,740 | A | * | 2/1994 | Tomita ........................... 73/146 |
| 5,389,881 | A | * | 2/1995 | Bittar et al. .................... 324/338 |
| 5,903,306 | A | * | 5/1999 | Heckendorn et al. ............ 348/85 |
| 6,109,372 | A | * | 8/2000 | Dorel et al. ...................... 175/61 |
| 6,697,102 | B1 | * | 2/2004 | Olsson et al. .................... 348/85 |
| 7,164,436 | B2 | * | 1/2007 | Kumagai et al. ................ 348/85 |
| 7,187,784 | B2 | * | 3/2007 | Tawfiq et al. .................. 382/109 |
| 2005/0006090 | A1 | * | 1/2005 | Chemali et al. .......... 166/250.01 |
| 2005/0067190 | A1 |   | 3/2005 | Tabanou et al. |

FOREIGN PATENT DOCUMENTS

EP 0487424 A1 5/1992  
* cited by examiner

*Primary Examiner* — Lin Ye  
*Assistant Examiner* — Amy Hsu  
(74) *Attorney, Agent, or Firm* — Darla Fonseca; Brigitte Echols; Charlotte Rutherford

(57) ABSTRACT

A borehole imaging tool for use in a wellbore penetrating an earth formation includes a pad hingedly connected to a collar, a sensor array carried by the pad, and an urging assembly in connection between the pad and the collar for extending the pad toward a wall of the wellbore. The imaging tool is compatible with both oil-based and water-based drilling fluids.

23 Claims, 6 Drawing Sheets

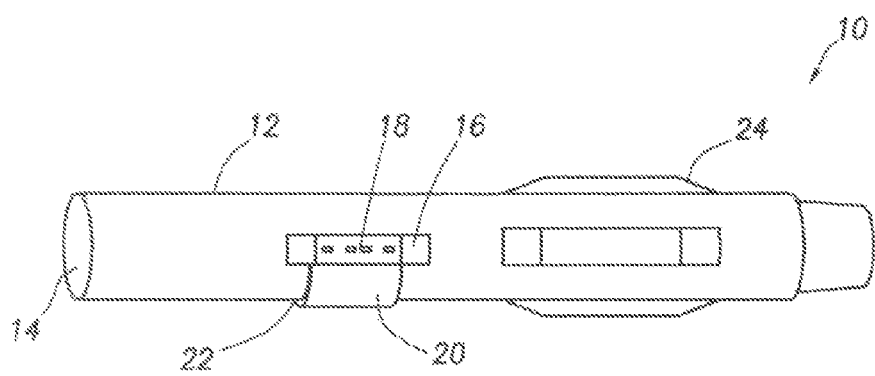
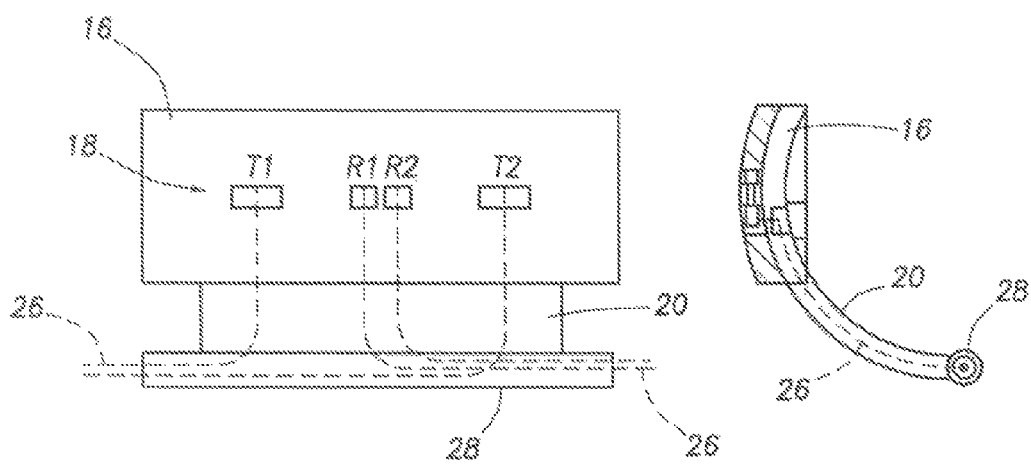

BOREHOLE IMAGING SYSTEM FOR CONDUCTIVE AND RESISTIVE DRILLING FLUIDS

RELATED APPLICATIONS

This application claims the benefit of U.S. Provisional Patent Application No. 60/676,372 filed on Apr. 29, 2005.

FIELD OF THE INVENTION

The present invention relates in general to borehole imaging and more particularly to a method and tool for imaging that is compatible with both conductive and resistive drilling fluids.

BACKGROUND

Heretofore, tools for borehole imaging have been specifically designed for use with either water-based mud or oil-based mud. These prior art imaging tool limitations are based in part on the different stand-off requirements for conductive and resistive drilling fluids.

There is a need therefore for a borehole imaging tool that can be used with conductive or resistive drilling fluids. There is a further need for borehole imaging while drilling that can be used in both conductive and resistive drilling fluids.

SUMMARY OF THE INVENTION

A borehole imaging tool is provided for use in a wellbore penetrating an earth formation. An embodiment of the imaging tool includes a pad hingedly connected to a collar, a sensor array carried by the pad, and an urging assembly in connection between the pad and the collar to extend the pad toward a wall of the wellbore.

A method of imaging a borehole while drilling is provided. An embodiment of the method includes the steps of positioning an imaging tool in a borehole, the imaging tool having a pad hingedly connected to a collar at a pivot point, and a sensor array carried by the pad, maintaining the pad during operation at a standoff of 0.5 centimeters or less and imaging while drilling the borehole.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjuction with the accompanying drawings, wherein:

FIG. 1 is a schematic view of an embodiment of a borehole imaging tool;

FIGS. 2A-2B are back and side views, respectively, of an embodiment of a sensor pad assembly;

DETAILED DESCRIPTION

Figure 3:
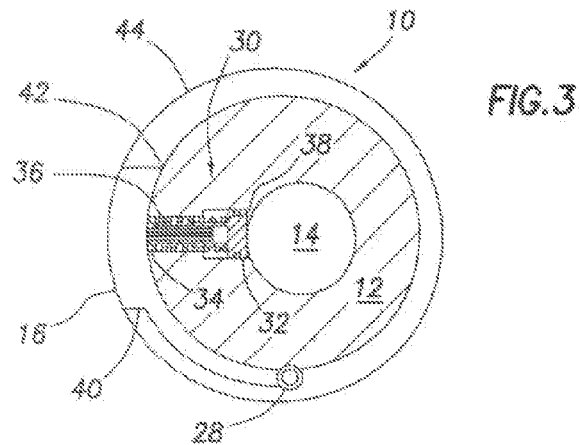
FIG. 3 is a cross-sectional end view from below of an embodiment of the imaging tool with the sensor pad in the retracted position.

Refer now to the drawings wherein depicted elements are not necessarily shown to scale and wherein like or similar elements are designated by the same reference numeral through the several views.

FIG. 1 is a schematic view of an embodiment of a borehole imaging tool of the present invention, generally denoted by the numeral 10, that is suitable for operation in wells utilizing conductive or resistive drilling fluids. Imaging tool 10 includes a collar 12, having an internal diameter forming a bore 14, and articulating pads 16 carrying electromagnetic sensors 18. Each pad 16 is hingedly connected to collar 12 by an arm 20 at pivot point 22. The illustrated imaging tool 10 is a logging-while-drilling (LWD) tool and thus may further include a hydraulic piston under each pad and a rotating valve to direct drilling fluid to the pistons providing thrust to the pads and a deflecting force on the bottomhole assembly.

Imaging tool 10 maintains sensors 18 within approximately 0.2 inches (approximately 0.5 cm) and more particularly within approximately 0.1 inches (0.254 cm) or less from the formation surrounding the wellbore. Thus, imaging tool 10 may be operated in wells having resistive or conductive drilling fluids. Imaging tool 10 may further include a centralizer or stabilizer 24 to facilitate maintaining tool 10 essentially centered within the wellbore.

Although collar 12 is illustrated as an elongated tubular member for purposes of illustration, it is noted that collar 12 may be a structure that is connected to the bottomhole assembly or to a tubular sub. It is further noted, that stabilizer 24 is not necessarily connected to collar 12 as illustrated, but is connected as a part of imaging tool 10 in operational cooperation with collar 12.

FIGS. 2A and 2B are schematic illustrations of pad 16 assemblies of the embodiment of FIG. 1. Cables 26 are routed from the sensor electronics (not shown) through a hollow hinge 28 to the sensors, denoted as transmitters "T" and receivers "R." As hinge 28 rotates to extend or retract pad 16, electrical cables 26 may twist. Thus, cables 26 must be sufficiently long, so that the torque on cables 26 is distributed and the strain remains in the elastic regime. It may be desired for the sensor electronics to be positioned within pads 16 (FIG. 10C.)

Figure 4:
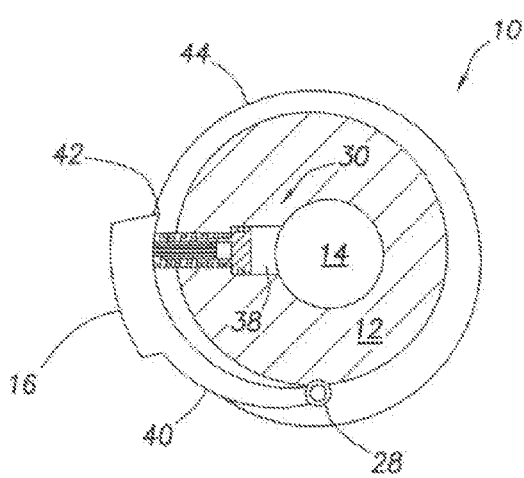
FIG. 4 is another view from below of the embodiment of FIG. 3 illustrating the sensor pad in the extended position.

Referring now to FIGS. 3 and 4, articulating operation of an embodiment of imaging tool 10 is illustrated. Imaging tool 10 includes an urging mechanism 30 for extending and retracting pad 16. Urging assembly 30 and the articulation of pad 16 is hydraulically operated by rig mud pumps (not shown) and the pressure differential between bore 14 and the wellbore or outside diameter 44 of collar 12. Urging assembly 30, in the illustrated embodiment, includes a first hydraulic piston 32, a second piston 34, and a biasing mechanism 36. Urging assembly 30 is positioned within a conduit 38 such that first hydraulic piston 32 is in pressure communication with bore 14 and second piston 34 is in operational connection with pad 16. First hydraulic piston 32 and second piston 34 are interconnected by biasing mechanism 36, shown as a spring.

When the rig mud pumps are off, the pressure in the wellbore or outside diameter 44 of collar 12 and the pressure in bore 14 are substantially equivalent. With the rig mud pumps off, pad 16 tends toward the retracted position within window 40 of collar 12 (FIG. 3). Pad 16 may be urged into window 40 by a retraction mechanism such a spring (not shown) or through occasional contact with the borehole wall.

When the rig mud pumps are on, the pressure differential between bore 14 and the outside diameter 44 of collar 12 acts on first hydraulic piston 32 urging pad 16 outward from collar 12 toward the borehole wall. Extension of pad 16 is limited by the tapered end 42 contacting outside diameter wall 44 of collar 12 within window 40 or by contacting the borehole wall. Biasing mechanism 36 loads and maintains pad 16 extended and in contact with the borehole wall and compensates for pressure differential fluctuations. Biasing mechanism 36 further reduces the total force that pad 16 applies to the borehole wall relative to a rigid connection to first hydraulic piston 32, thereby reducing the wear on pad 16.

Similarly, a separate hydraulic system could be carried on the imaging tool 10 such that urging mechanism 30 can be operated without the direct use of mud (i.e., the mud is not the hydraulic fluid bearing on piston 32). The separate hydraulic system can be actuated, for example, by a command transmitted from the surface or a command from a processor downhole.

Figure 5:
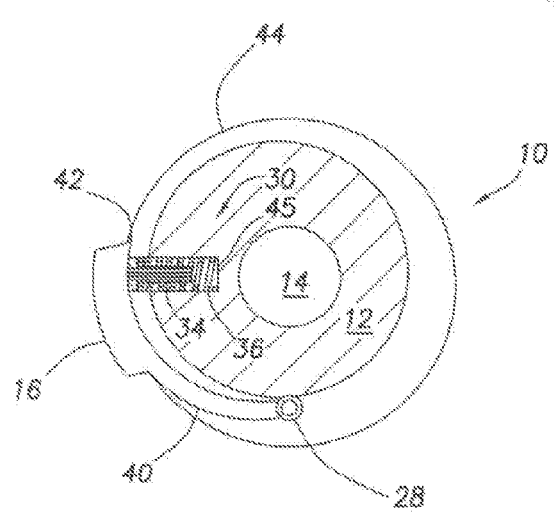
FIG. 5 is an end view from below of the imaging tool illustrating another embodiment of a pad urging assembly.

FIG. 5 is an end view of imaging tool 10 illustrating another embodiment of urging assembly 30. In this embodiment, urging assembly 30 is mechanically operated and includes biasing mechanism 36 and second piston 34. Urging assembly 30 is positioned within a cavity 45 formed by collar 12 and is operational contact with pad 16. Alternatively, a torsional spring may be mounted proximate the hinge to provide the urging bias.

Figure 6:
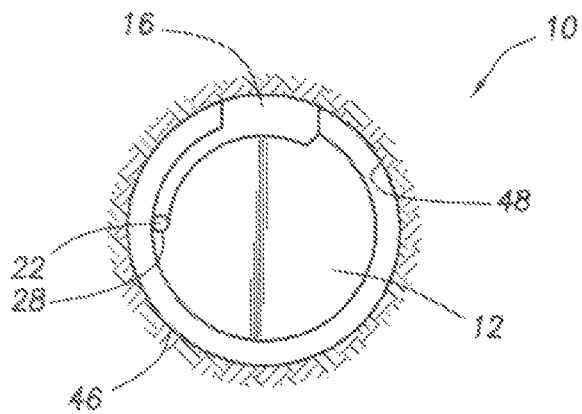
FIG. 6 is an end view from below of an embodiment of the imaging tool centered in a wellbore.
Figure 7:
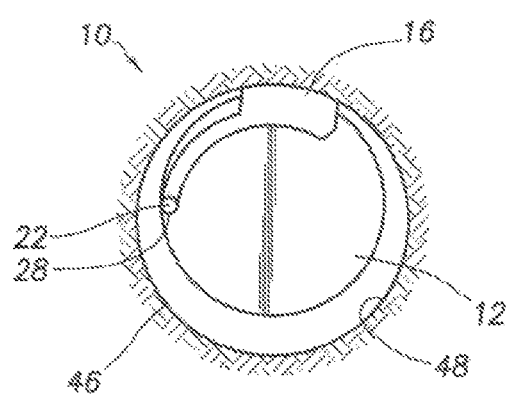
FIG. 7 is an end view from below of the imaging tool eccentered in a wellbore.
Figure 8:
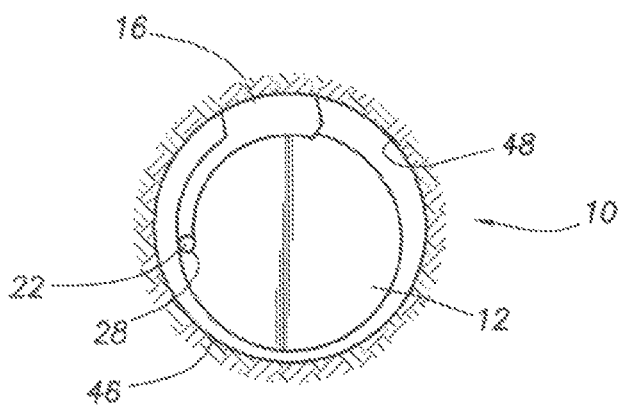
FIG. 8 is an end view from below of the imaging tool eccentered in a wellbore.

Referring now to FIGS. 6 through 8, imaging tool 10 is shown in various positions within a borehole 46. In the examples of FIGS. 6 to 8, borehole 46 is an 8.5 inch (21.6 cm) diameter hole, collar 12 has a 7 inch (17.8 cm) diameter, and pad 16 has a width of 3 inches (7.6 cm). In FIG. 6, imaging tool 10 is substantially centered within borehole 46 and pad 16 is extended and in operational contact with the wall. During operational contact, sensors 18 (FIG. 1) are maintained approximately 0.2 inches (0.5 cm) or less from wall 48. Desirably, the standoff is maintained at approximately 0.1 inches (0.24 cm ) or less.

In FIG. 7, pad 16 is 0.6 inches (1.5 cm) closer to wall 48 of wellbore 46 relative to the illustration of FIG. 6. In this example, the gap between collar 12, proximate pad 16, and wall 48 is approximately 0.15 inches (0.4 cm). In FIG. 8, pad 16 is 0.6 inches (1.5 cm) farther from wall 48 relative to the illustration of FIG. 6. In this example, the gap between collar 12, proximate pad 16, and wall 48 is approximately 1.35 inches (3.4 cm).

In the examples of FIGS. 6 through 8, the face of pad 16 remains in very close contact with the formation, and sensors 18 (FIG. 1) are in operational contact with the formation. However, it is noted that due to space limitations in wellbore 46 and thus of imaging tool 10, the radial distance that pad 16 can be extended from collar 12 is limited. By positioning pivot point 22 radially approximately 90 degrees from pad 16, the radial extension of pad 16 can be maximized.

In accordance with the present invention, various sensor 18 arrays may be utilized. Example of electromagnetic propagation sensors include endfire magnetic dipole (EMD), broadside magnetic dipole (BMD) sensors, cross-dipole sensors, multiple sensor arrays, and mixed arrays. Endfire arrays include an arrangement of transmitters T and receivers R in which the dipoles are oriented along the axis of imaging tool 10. Broadside arrays include an arrangement of transmitters T and receivers R in which the dipoles are oriented perpendicular to the axis of imaging tool 18. Further detail can be found in U.S. Pat. No. 4,689,572 and U.S. Pat. No. 4,704,581.

Figure 9A:
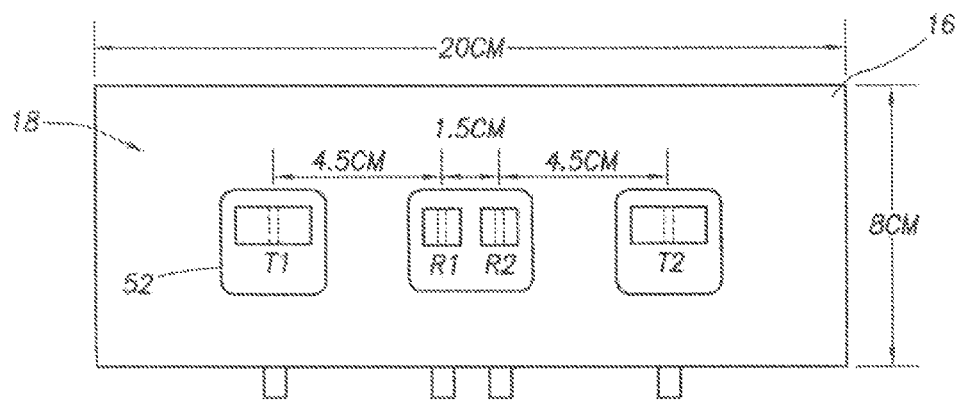
FIG. 9A is a face view of an embodiment of a sensor pad with an EMD sensor array.
Figure 9B:
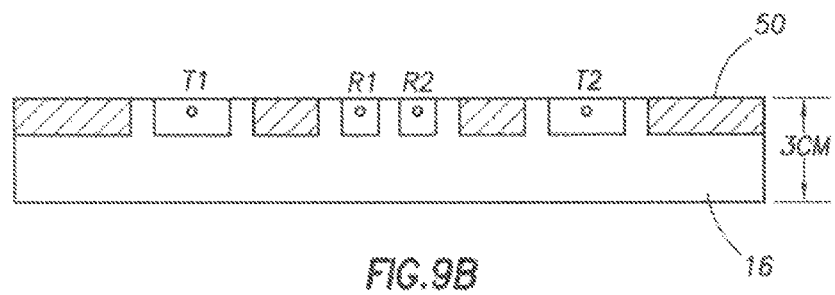
FIG. 9B is a cross-sectional view from an edge of the sensor pad of FIG. 9A.
Figure 9C:
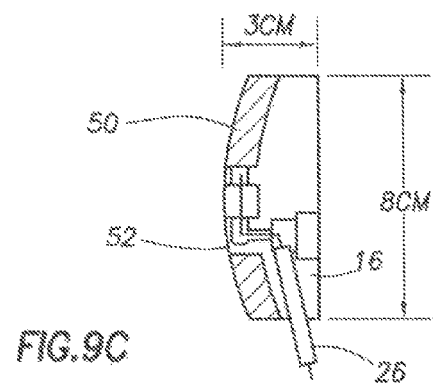
FIG. 9C is a cross-sectional view of the sensor pad of FIG. 9A through an antenna.

Referring now to FIGS. 9A, 9B, and 9C, an embodiment of a pad 16 carrying an EMD array is illustrated. Pad 16 in the illustrated embodiment is approximately 20 cm in length, 8 cm wide, and 3 cm deep. The face 50 of pad 16 is curved to match a borehole diameter and may be constructed of a hard-facing or wear plate. Openings 52 are formed through the wear plate for the antennas "T" and "R." The antennas may be slightly recessed below the outer surface of the wear plate. In this embodiment the receiver and transmitter electronics are positioned exterior of pad 16, and are connected to the antennas by coaxial cable 26.

Figure 10A:
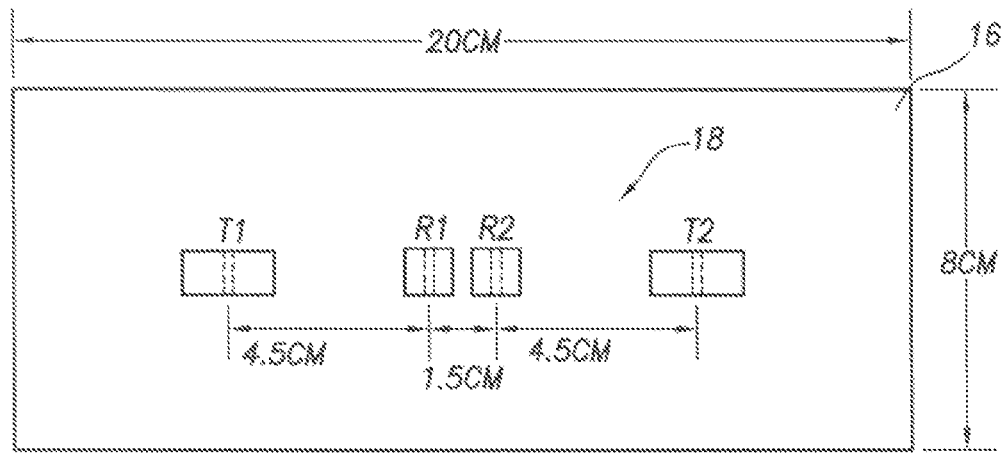
FIG. 10A is a face view of an embodiment of a sensor pad having internal sensor electronics.
Figure 10B:
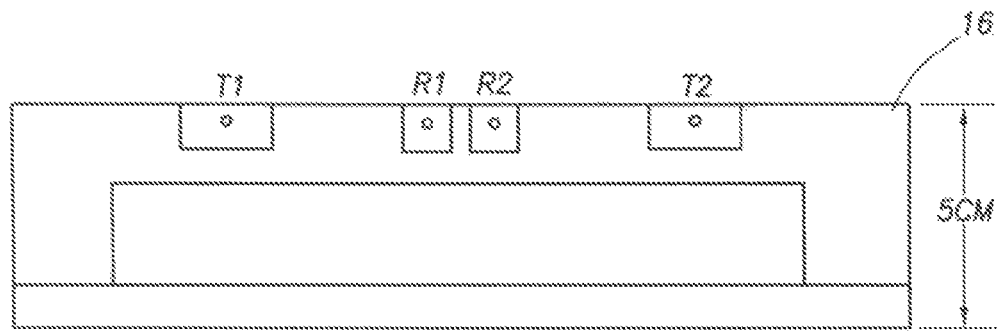
FIG. 10B is a cross-section view from an edge of the sensor pad of FIG. 10A.
Figures 10C, 10D:
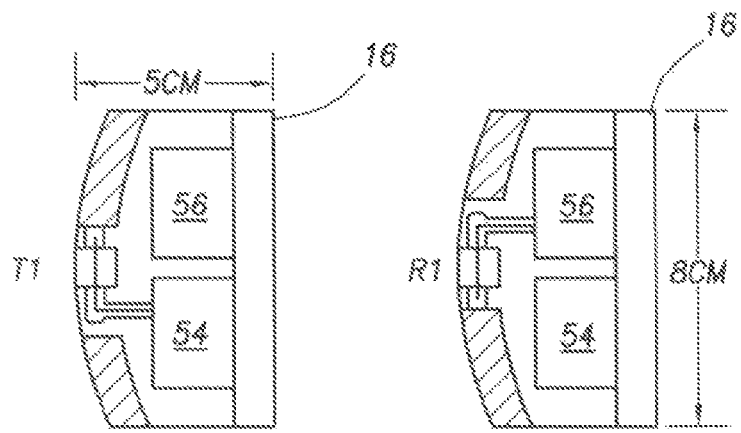
FIG. 10C is a cross-section view of the sensor pad of FIG. 10A through a transmitter.
FIG. 10D is a cross-section view of the sensor pad of FIG. 10A through a receiver.

FIGS. 10A through 10C illustrate another embodiment of a sensor pad 16 including an sensor 18 array including the transmitter electronics 54 and receiver electronics 56. Electronics 54 and 56 may include without limitation oscillators, transmitter amplifiers and switches, receiver preamplifiers and switches. Incorporation of electronic circuits 54 and 56 within pad 16 may eliminate the need for long lengths of coaxial cables.

Figure 11:
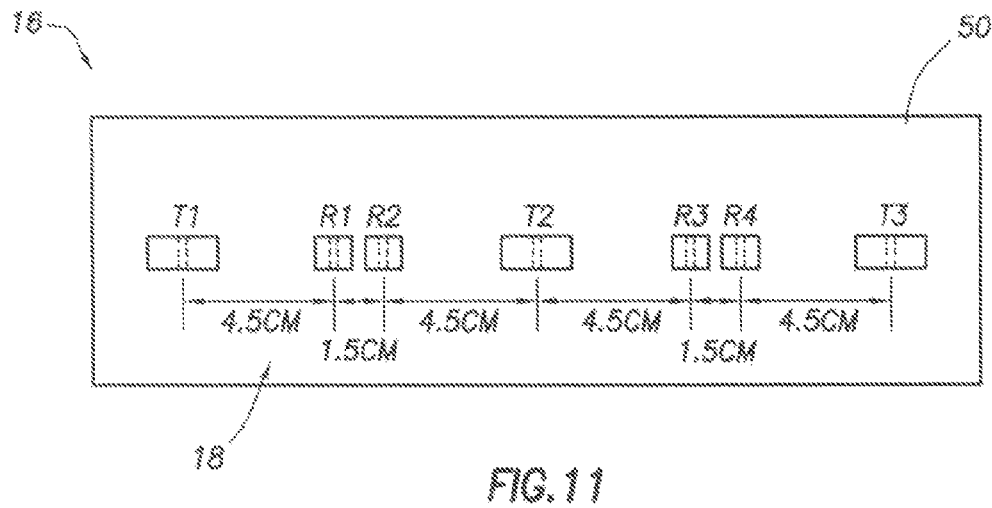
FIG. 11 is a face view of another embodiment of a senor pad with multiple EMD sensor arrays.

An embodiment of a sensor pad 16 having a dual EMD sensor 18 array is illustrated in FIG. 11. An additional transmitter T3 and two additional receivers R3, R4 are connected to pad 16. The phase shift and attenuation between receivers R1 and R2 are measured with transmitters T1 and T2 using normal borehole compensated processing. Similarly, the phase shift and attenuation between receivers R3 and R4 are measured with transmitters T2 and T3. An advantage of this embodiment is that the measurements made with R1 and R2 should be identical to those made by R3 and R4 when the imaging tool has moved a distance equal to the separation of the two measure points (e.g. 10.5 cm). These two sets of measurements can then be used to infer the rate of penetration and thus to obtain a better measurement of the relative depth.

Figure 12:
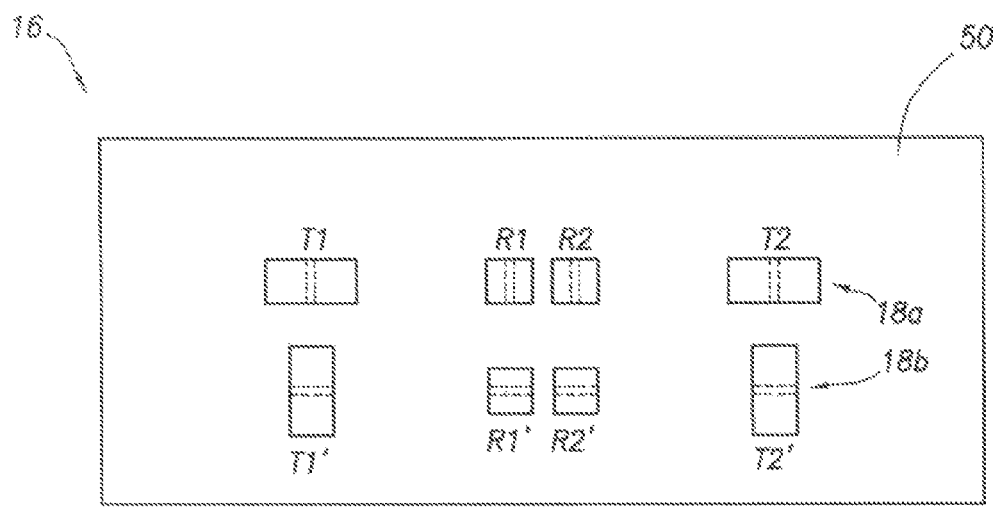
FIG. 12 is a face view of another embodiment of a sensor pad with a EMD sensor array and a BMD sensor array.

FIG. 12 illustrates another embodiment of a sensor pad 16 of the present invention. In this embodiment, pad 16 includes an endfire magnetic dipole array 18a and a broadside magnetic dipole array 18b b. Both arrays have the same axial measure points, but are displaced azimuthally. Because the imaging tool rotates, the EMD and BMD measurements at the same azimuth can be combined for joint inversion of formation properties. Joint inversion of EMD and BMD data may be used to reduce stand-off effects and improve the image quality.

From the forgoing detailed description of specific embodiments of the invention, it should be apparent that a borehole imaging system for operation with conductive and resistive wellbore fluids that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the scope of the invention as defined by the appended claims which follow.

What is claimed is:

1. A while-drilling borehole imaging tool for use in a wellbore penetrating an earth formation, the tool comprising:
    a drill collar;
    a pad hingedly connected to the drill collar, wherein the pad is hingedly connected to the drill collar at a pivot point, the pivot point being positioned approximately 90 degrees circumferentially about the drill collar from the pad;
    one or more sensors carried by the pad; and
    an urging assembly in connection between the pad and the drill collar.

2. The tool of claim 1, wherein the one or more sensors includes at least one array of endfire magnetic dipole antennas, one array of broadside magnetic dipole antennas, or a combination of both.

3. The tool of claim 1, wherein the urging assembly comprises a spring.

4. The tool of claim 1, wherein the pad is maintained less than 0.5 centimeters from a wall of the wellbore.

5. The tool of claim 1, wherein the urging assembly is a hydraulic mechanism.

6. The tool of claim 1, wherein the urging assembly is actuated by a command.

7. The tool of claim 1, wherein the urging assembly includes:
    a conduit formed through the drill collar;
    a first piston positioned in the conduit in pressure communication with a bore through the drill collar;
    a second piston in operational connection with the pad; and
    a biasing mechanism interconnecting the first piston and the second piston.

8. The tool of claim 1, further including a stabilizer in operational cooperation with the drill collar.

9. The tool of claim 1, further including wiring passing through the hinged connection of the pad.

10. The tool of claim 1, further including an electronic assembly disposed in the pad.

11. A tool for borehole imaging while drilling and compatible with both conductive and resistive drilling fluids, the tool comprising:
    a drill collar;
    a pad hingedly connected to the drill collar, wherein the pad is hingedly connected to the drill collar at a pivot point, the pivot point being positioned approximately 90 degrees circumferentially about the drill collar from the pad;
    at least one antenna carried by the pad; and
    an urging assembly in connection between the pad and the drill collar.

12. The tool of claim 11, further including an electronic assembly disposed in the pad.

13. The tool of claim 11, wherein the at least one antenna includes at least one array of endfire magnetic dipole antennas, one array of broadside magnetic dipole antennas, or a combination of both.

14. The tool of claim 11, wherein the urging assembly is a hydraulic mechanism.

15. The tool of claim 11, wherein the urging assembly is actuated by a command.

16. The tool of claim 11, wherein the urging assembly includes:
    a conduit formed through the drill collar;
    a first piston positioned in the conduit in pressure communication with a bore through the drill collar;
    a second piston in operational connection with the pad; and
    a biasing mechanism interconnecting the first piston and the second piston.

17. The tool of claim 11, further including wiring passing through the hinged connection of the pad.

18. The tool of claim 11, wherein the urging assembly comprises a spring.

19. A method of imaging a borehole while drilling, the method comprising:
    positioning an imaging tool in a borehole, the imaging tool having a pad hingedly connected to a drill collar at a pivot point, the pivot point being positioned approximately 90 degrees circumferentially about the drill collar from the pad, and one or more sensors carried by the pad;
    maintaining the pad during operation at a standoff of 0.5 centimeters or less;
    making measurements while maintaining; and
    using the measurements to create an image of the borehole.

20. The method of claim 19, wherein the one or more sensors includes at least one array of endfire magnetic dipole antennas, one array of broadside magnetic dipole antennas, or a combination of both.

21. The method of claim 19, further comprising commanding the urging assembly to actuate.

22. A logging-while-drilling tool, comprising:
    a drill collar;
    a pad moveably connected to the drill collar at a pivot point, the pivot point being positioned approximately 90 degrees circumferentially about the drill collar from the pad;
    one or more sensors carried by the pad; and
    wiring electrically connected to the one or more sensors and passing through the connection of the pad to the drill collar.

23. A logging-while-drilling tool, comprising:
    a drill collar;
    a pad moveably connected to the drill collar at a pivot point, the pivot point being positioned approximately 90 degrees circumferentially about the drill collar from the pad;
    one or more sensors carried by the pad; and
    an electronic assembly disposed in the pad.

* * * * *